No. 740,136. PATENTED SEPT. 29, 1903.
J. D. HUMPHREY & H. G. STORZ.
INKING MECHANISM FOR PRINTING, STAMPING, NUMBERING, OR SIMILAR MACHINES.
APPLICATION FILED JUNE 23, 1903.
NO MODEL. 3 SHEETS—SHEET 1.

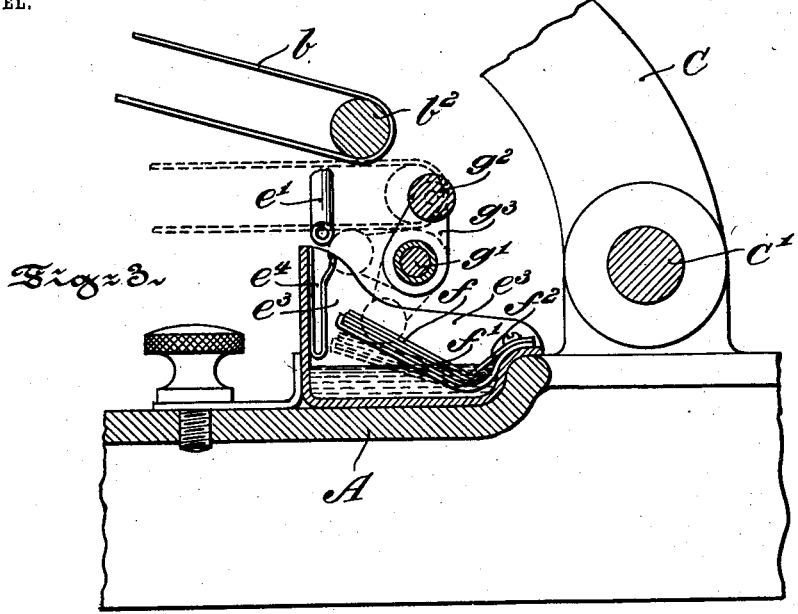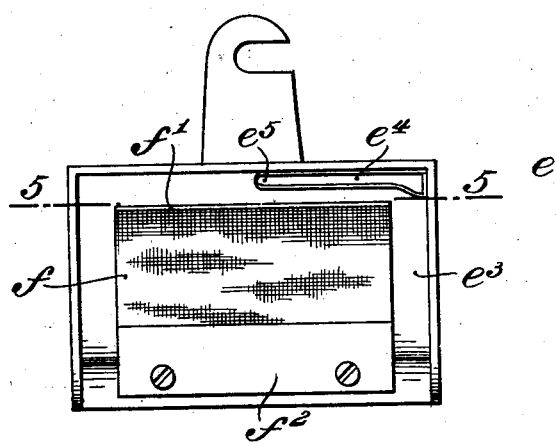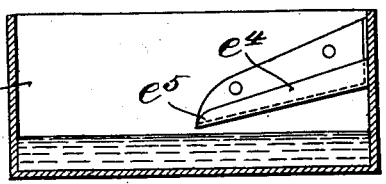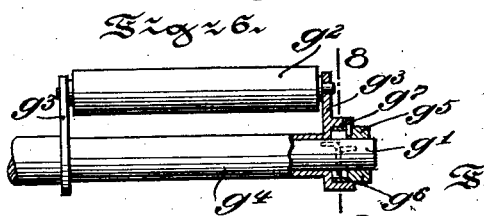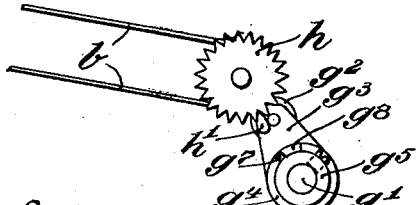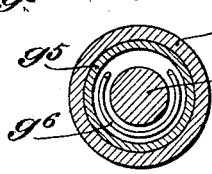

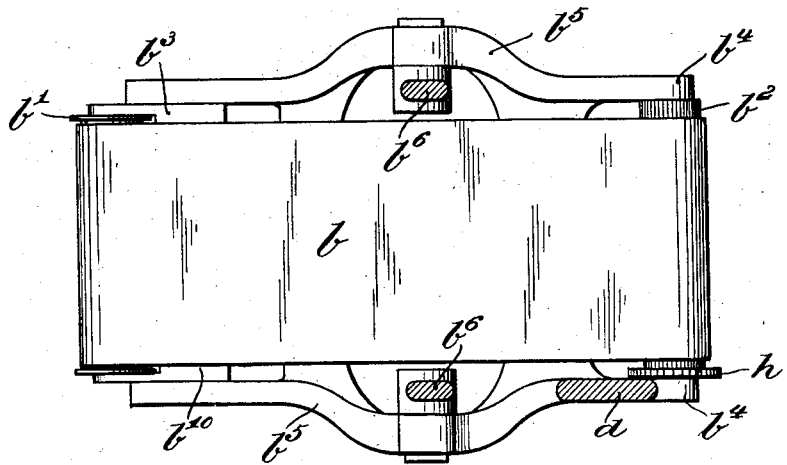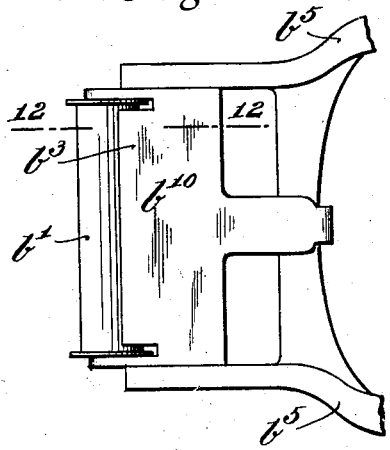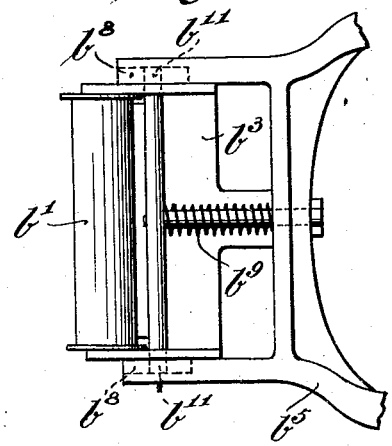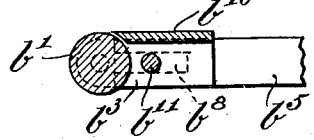

No. 740,136. Patented September 29, 1903.

UNITED STATES PATENT OFFICE.

JAMES D. HUMPHREY AND HERMANN G. STORZ, OF PHILADELPHIA, PENNSYLVANIA, ASSIGNORS TO CLARENCE S. LUITWIELER, OF NEWTON, MASSACHUSETTS.

INKING MECHANISM FOR PRINTING, STAMPING, NUMBERING, OR SIMILAR MACHINES.

SPECIFICATION forming part of Letters Patent No. 740,136, dated September 29, 1903.

Application filed June 23, 1903. Serial No. 162,723. (No model.)

*To all whom it may concern:*

Be it known that we, JAMES D. HUMPHREY, residing at Overbrook, Philadelphia, and HERMANN G. STORZ, residing at Philadelphia, in the county of Philadelphia and State of Pennsylvania, citizens of the United States, have jointly invented certain new and useful Improvements in Inking Mechanism for Printing, Stamping, Numbering, or Similar Machines, of which the following is a specification.

Our invention has relation to a mechanism for supplying ink to the type or stamp of a printing, stamping, numbering, or similar machine, and in such connection it relates to the construction and arrangement of such a mechanism.

Heretofore in printing and similar machines it has been usual to supply ink to the type or stamp before each impression through the intermediary of a pad or cushion previously surcharged with the ink. In such cases either the type or stamp has been moved into contact with a stationary pad or cushion, or vice versa. The principal disadvantages of such an inking mechanism are, first, that the type or stamp at successive contacts with the ink-pad is brought against the pad at the same portion or portions, and hence succeeding inkings become less and less effective, thus rendering successive imprints or impressions less and less plain, and, second, after being in use for a short period of time the ink-pad becomes hard and its ink becomes exhausted or impaired in flow.

The principal objects of our present invention are, first, to provide an inking mechanism whereby ink from a reservoir may be fed directly to a movable ink-carrier and said ink-carrier presented to the type-surface; second, to provide in such a mechanism means whereby a predetermined quantity of ink may be wiped upon the movable ink-carrier after each imprint of the type-surface, and, third, to provide in such a mechanism means whereby the ink-carrier may be moved at each imprinting operation to present a fresh surface to the type or stamp after each impression.

The nature and scope of our invention will be more fully understood from the following description, taken in connection with the accompanying drawings, forming part hereof, in which—

Figure 1:
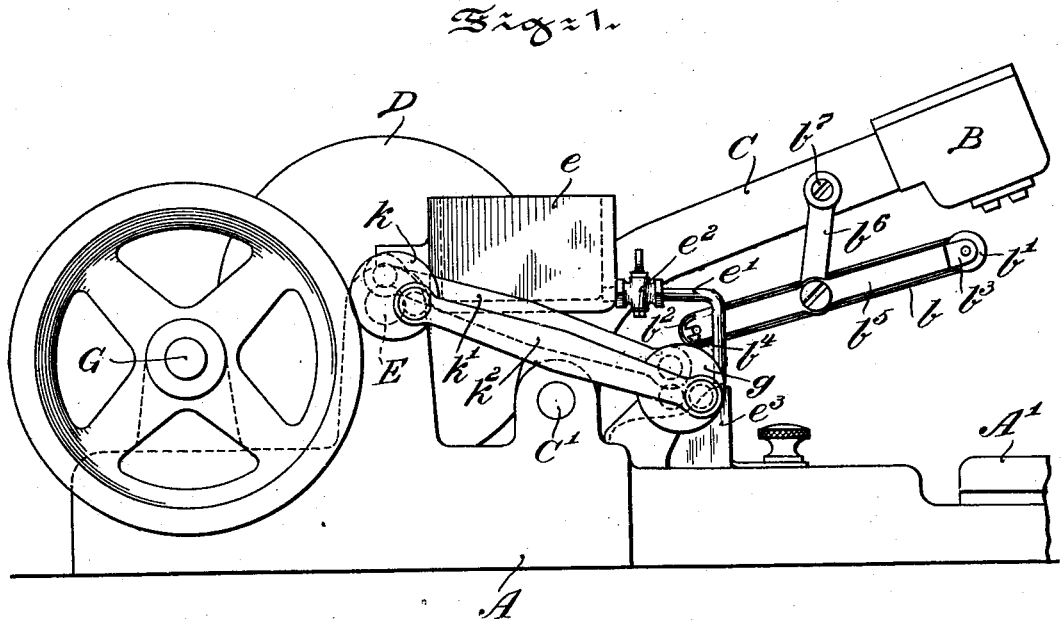
Figure 2:
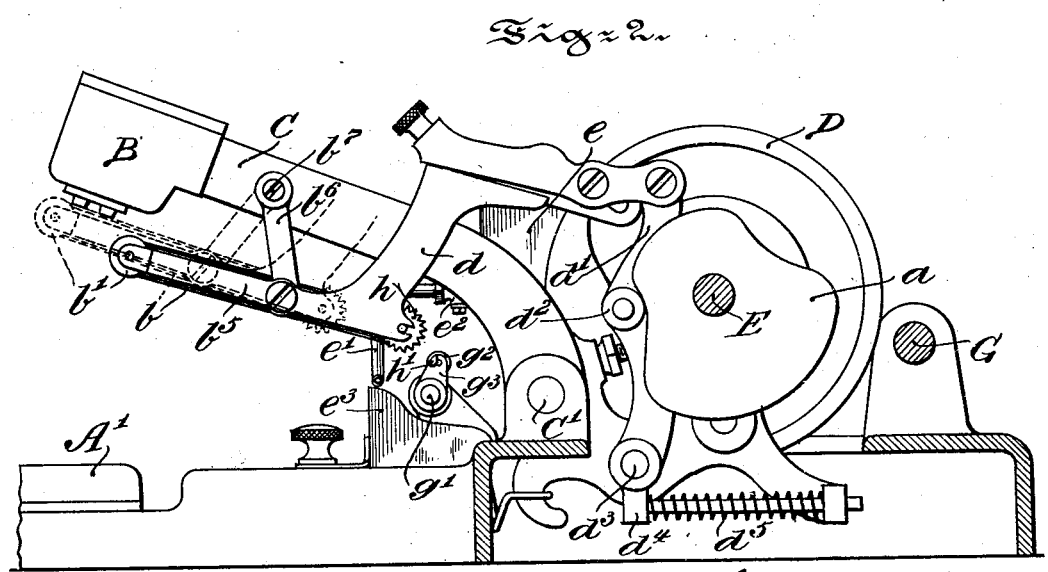

Figure 1 is a side elevational view of an inking mechanism embodying main features of our invention. Fig. 2 is a similar view, partly sectioned, of the opposite side of the mechanism. Fig. 3 is an enlarged longitudinal view illustrating in detail the means for transferring ink to the traveling ink-carrier. Fig. 4 is a top or plan view, enlarged, of the ink-trough and elastic pad thereon. Fig. 5 is a cross-sectional view on the line 5 5 of Fig. 4. Fig. 6 is a detail view, enlarged, of the ink-transferring roller. Fig. 7 is a detail view, enlarged, of the means controlled by the ink-transferring roller for moving the ink-carrier with a step-by-step motion. Fig. 8 is an enlarged cross-sectional view on the line 8 8 of Fig. 6. Fig. 9 is a top or plan view, enlarged, of the ink-carrier. Figs. 10 and 11 are detail views, in top and underneath plan, of the forward end of the frame carrying the ink-carrier, said carrier being removed; and Fig. 12 is a longitudinal sectional view on the line 12 12 of Fig. 10.

In the drawings the inking mechanism of our invention is illustrated when used with and upon a stamping and numbering machine of the form or type illustrated and described in the United States Letters Patent No. 660,512, granted to Joseph D. Humphrey and Joseph French under date of October 23, A. D. 1900, and only such parts of said machine of the Patent No. 660,512 are herein illustrated and described as are necessary to a proper understanding of the operation of the inking mechanism forming the subject-matter of the present invention. It should be understood, however, that the inking mechanism to be hereinafter described is not necessarily limited to use in such special type of machine disclosed in said Patent No. 660,512; but, on the contrary, it may be used with other forms of stamping and numbering machines or with printing or similar machines in which the type-surface is to be periodically inked.

Referring to the drawings, A is the frame of the machine, carrying at one end the platen A', above which a type-head or stamp B, carrying the type-disks, is supported at one end of a vibrating arm C. The arm C is secured at the other end to a rock-shaft C' and is arranged to be operated by a cam-wheel D through means not shown, but which are described and shown in the Patent No. 660,512, above referred to. The cam-wheel D is keyed to a shaft E, to which motion is periodically conveyed from the power-shaft G, also in the manner described and shown in said Patent No. 660,512. Upon the shaft E is also keyed a cam $a$, which, as hereinafter described, controls the movement of an ink-carrier $b$ toward or away from the type-head or stamp B.

Referring now to the inking mechanism of our present invention, the ink-carrier $b$ consists, preferably, of an endless apron, of fibrous material, passing around two rollers $b'$ and $b^2$. The front roller $b'$ is supported in a bracket $b^3$ and is carried at the forward end of the frame $b^5$, extending beneath the vibrating arm C. The roller $b^2$ is supported directly in the rear end $b^4$ of the frame $b^5$. The frame $b^5$ is carried intermediate of its length by two links $b^6$, secured at their upper ends to a rock-shaft or pin $b^7$, extending through the arm C. An oscillating motion is given to the frame $b^5$ and ink-carrier $b$ by means of the following preferred mechanism: To one side of the frame $b^5$ is rigidly secured the angular arm $d$, extending upward and backward and pivotally connected to a cam-arm $d'$, carrying the roller $d^2$, in engagement with the throw-surface of the cam $a$, secured on the shaft E. The cam-arm $d'$ is pivoted, as at $d^3$, to an extension of the arm C and has an end $d^4$ projecting below the pivot $d^3$, against which a spring $d^5$ presses to normally keep the roller $d^2$ against the cam $a$. This mechanism for oscillating the frame $b^5$ is substantially the same as the corresponding mechanism for oscillating the ink-pad, as described and illustrated in the Patent No. 660,512, above mentioned. The apron or ink-carrier $b$ is held taut over the rollers $b'$ and $b^2$ in preferably the following manner: One of said rollers $b'$ has its supporting-bracket $b^3$ provided with projecting pins $b^{11}$, working in slots $b^8$ in the end of the frame $b^5$. A spring $b^9$, bearing against the bracket $b^3$ and a stationary part of the frame $b^5$, serves to move said bracket $b^3$ outward in the frame $b^5$, and thus the apron $b$ is kept taut under tension of the spring $b^9$. Adjacent to the forward roller $b'$ and beneath the apron or ink-carrier $b$ is arranged a table $b^{10}$, carried by the bracket $b^3$ and arranged to support the apron $b$ in flat position at that part which is to come upward into contact with the type of the type-head B. The table $b^{10}$ is of a width sufficient to accommodate the number of rows of type in the type-head B, so that the rows will each engage a flat supported portion of the apron $b$ during each inking operation.

The movement of the ink-carrier $b$ is as follows: In Fig. 2 the position of the carrier $b$ and its frame $b^5$ (indicated in full lines) is that which they occupy during a period of rest of the cam $a$ and shaft E, the type-head B being in an elevated position away from the platen A'. When now the shaft E and cam $a$ rotate, the ink-carrier $b$ is pushed forward and upward by the cam-arm $d'$ and angular arm $d$ until it rests at its forward end against the type in the type-head B. This position is indicated by dotted lines in Fig. 2. The carrier $b$ in this position inks the type and is then drawn backward and downward until it reaches a substantially horizontal position, as illustrated in dotted lines in Fig. 3, in which position of the ink-carrier $b$ the forward end is retracted sufficiently far from the type-head B to permit the oscillating arm C to descend and the type-head B to print or stamp the article placed upon the platen A'. The ink-carrier $b$ according to the present invention is supplied with ink from a receptacle at each movement away from the type-head B and is also advanced step by step over the rollers $b'$ and $b^2$ during said movement.

The preferred means of feeding ink to the apron $b$ is as follows: From a reservoir $e$, containing the ink, extends a pipe or duct $e'$, controlled by a valve $e^2$ of suitable construction. The reservoir $e$ is supported by the frame A of the machine and the pipe or duct $e'$ discharged into an ink-receptacle $e^3$, located on the frame A adjacent to the rear end of the ink-carrier $b$ when said carrier is in its retracted position. The pipe $e'$ does not by preference enter the tank or receptacle $e^3$ directly, but discharges into a chute $e^4$, (see Figs. 3, 4, and 5,) extending from one side of the tank $e^3$ along the front end of the tank and terminating in a spout $e^5$, which discharges at approximately a central point of the front end of the tank. By this means the ink, which is in semifluid condition, is discharged at about the center line of the tank $e^3$ and can spread evenly over the bottom of the tank. Partly submerged in the ink of the tank $e^3$ is a pad $f$, formed of layers of absorbent material supported upon a base of a spring metal $f'$. This base $f'$ extends down into the tank through the ink and has its free end projecting upward above the ink in said tank. A clip or plate $f^2$ serves to confine the base to the rear side of the tank $e^3$ and also to confine the absorbent material to the base $f'$. Above the tank $e^3$ is arranged an eccentric disk $g$, to which is secured a crank-shaft $g'$, carrying an inking-roller $g^2$. The shaft $g'$ when rotated causes the roller $g^2$ to enter the tank $e^3$ and to wipe over the absorbent covering of the spring-plate $f'$ and to depress said plate $f'$ into the ink in the tank $e^3$. The ink-carrier or apron $b$ when it reaches its lowest and horizontal position (indicated in dotted lines in Fig. 3) has a portion of its surface near the rear roller $b^2$ in the path of the inking-roller $g^2$, and hence as said roller $g^2$ emerges from the tank $e^3$ after wiping over the absorbent material on the spring-plate $f'$ it wipes the ink thus taken up upon the surface of the apron $b$, and the ink is thus transferred from the tank or receptacle $e^3$ to the apron $b$. To prevent the ink-roller $g^2$ from jamming against the apron $b$, as well as to facilitate the wiping action of the roller $g^2$ upon said apron, the ink-roller $g^2$ is permitted to yield slightly on its crank-shaft $g'$ in a direction opposite to that in which it travels with said crank-shaft $g'$. The preferred construction and arrangement of the means for permitting of this yielding movement to the ink-roller $g^2$ is illustrated in detail in Figs. 6, 7, and 8. It consists in mounting the roller $g^2$ in supporting-arms $g^3$, projecting from a sleeve $g^4$, surrounding the crank-arm $g'$. Upon the end of the crank-arm $g'$ is secured a collar $g^5$, and the collar $g^5$ and sleeve $g^4$ are connected by a spring $g^6$, coiled around the crank-arm $g'$, one end of said spring $g^6$ entering the sleeve and the other end entering the collar $g^5$. A pin $g^7$, projecting from the collar $g^5$, enters a slot $g^8$ in the sleeve, and thus limits the movement of the sleeve upon the crank-shaft $g'$. As the inking-roller $g^2$ travels over the apron $b$ the roller $g^2$, its supporting-arms $g^3$, and the sleeve $g^4$ may turn backward against the tension of the spring $g^6$ on the crank-shaft $g'$ to the extent of play of the pin $g^7$ in the slot $g^8$.

The preferred means for advancing the ink-carrier or apron $b$ after it has reached its lower horizontal position is as follows: Upon one end of the rear roller $b^2$, around which the endless apron $b$ is passed, is secured a ratchet-wheel $h$, and upon an arm $g^3$, which supports the inking-roller $g^2$, is secured a dog or pawl $h'$. As the inking-roller passes over the surface of the apron $b$ and just as it leaves said apron the dog or pawl $h'$ engages the ratchet-wheel $h$ and turns said wheel a predetermined distance. The roller $b^2$, carrying the apron $b$, is turned a corresponding distance, and the apron $b$ is thus advanced over both rollers $b'$ and $b^2$ and presents over the table $b^{10}$ and below the type-head B a fresh surface, which will contact with the type in the type-head at a next succeeding inking operation. The rotary movement of the eccentric $g$, the crank-shaft $g'$, and the ink-roller $g^2$ may be secured by any well-known means. As illustrated, one form of said means consists in connecting the eccentric $g$ with a second eccentric $k$ upon the shaft E by means of the two connecting-arms $k'$ and $k^2$. The use of two connecting-arms $k'$ and $k^2$ insures the operation of the eccentric $g$ without dead-centering.

Having thus described the nature and objects of our invention, what we claim as new, and desire to secure by Letters Patent, is—

1. In an inking mechanism for machines of the character described, an ink-reservoir, an ink-carrier located outside the reservoir and an ink-transferring roller arranged to rotate in the ink-reservoir and to wipe over a portion of the ink-carrier to transfer thereto a predetermined quantity of ink from the reservoir.

2. In an inking mechanism for machines of the character described, an ink-reservoir, an ink-transferring roller arranged to rotate in said reservoir and an ink-carrier, comprising a frame and an endless band carried therein combined with means for oscillating said frame to bring said band periodically into contact with the ink-transferring roller.

3. In an inking mechanism for machines of the character described, a type-head, an ink-reservoir located below and to the rear of said type-head an ink-carrier, means for oscillating said ink-carrier between the reservoir and the type-head and means arranged within the reservoir for transferring ink from said reservoir to the ink-carrier when said carrier is oscillated toward the type-head.

4. In an inking mechanism of the character described, an ink-carrier, in combination with an ink-transferring roller arranged to wipe over a portion of the surface of the carrier, a tank or receptacle for the ink arranged adjacent to the roller, a spring-plate having a face of absorbent material projecting through and above the ink in said receptacle and means for rotating said roller to cause the roller to periodically wipe over the absorbent face of said spring-plate and to thereby depress said plate and its face into the ink of said receptacle.

5. In an inking mechanism for machines of the character described, a type-head in combination with an ink-carrier, a frame in which said carrier is supported, means for oscillating said frame to bring the carrier periodically at one movement of the frame in contact with the type-head, means for transferring ink to said carrier periodically upon the reverse movement of the frame, and mechanism controlled by said ink-transferring means and arranged to shift the carrier periodically in said frame.

In testimony whereof we have hereunto set our signatures in the presence of two subscribing witnesses.

JAMES D. HUMPHREY.
HERMANN G. STORZ.

Witnesses:
J. WALTER DOUGLASS,
THOMAS M. SMITH.